United States Patent
Hodgins et al.

[11] Patent Number: 5,821,740
[45] Date of Patent: Oct. 13, 1998

[54] DC-TO-DC CONVERTER HAVING FAST OVER-CURRENT DETECTION AND ASSOCIATED METHODS

[75] Inventors: Robert G. Hodgins, Durham; Charles E. Hawkes, Cary; Michael M. Walters, Raleigh, all of N.C.

[73] Assignee: Harris Corporation, Palm Bay, Fla.

[21] Appl. No.: 800,420

[22] Filed: Feb. 14, 1997

Related U.S. Application Data

[60] Provisional application No. 60/011,695 Feb. 15, 1996.

[51] Int. Cl.⁶ .................................................. G05F 1/573
[52] U.S. Cl. .............................. 323/277; 363/21; 361/57
[58] Field of Search ........................ 363/21, 56; 323/274, 323/277; 361/57

[56] References Cited

U.S. PATENT DOCUMENTS

| | | | |
|---|---|---|---|
| 4,363,064 | 12/1982 | Billings et al. | 323/277 |
| 4,994,955 | 2/1991 | Schoofs et al. | 363/95 |
| 5,043,674 | 8/1991 | Bonaccio et al. | 330/257 |
| 5,167,024 | 11/1992 | Smith et al. | 395/375 |
| 5,233,287 | 8/1993 | Lenk | 323/268 |
| 5,325,258 | 6/1994 | Choi et al. | 323/277 |
| 5,338,987 | 8/1994 | Tomasetti et al. | 307/570 |
| 5,423,045 | 6/1995 | Kannan et al. | 395/750 |
| 5,452,434 | 9/1995 | MacDonald | 395/550 |
| 5,457,790 | 10/1995 | Iwamura et al. | 395/494 |
| 5,631,549 | 5/1997 | Hong | 323/277 |
| 5,666,044 | 9/1997 | Tuozzolo | 323/277 |
| 5,694,305 | 12/1997 | King et al. | 363/21 |

*Primary Examiner*—Stuart N. Hecker
*Attorney, Agent, or Firm*—Allen, Dyer, Doppelt, Milbrath & Gilchrist, P.A.

[57] ABSTRACT

A DC-to-DC converter includes a pulse width modulation circuit for modulating a switch to produce current pulses having at least a minimum pulse width to thereby control an output voltage to the load. The converter also includes a current limit determining circuit for determining when a desired peak current is no longer sufficient to maintain a desired output voltage thereby defining a current limit condition. In addition, the pulse width modulating circuit, when operating at the minimum pulse width, thereby defines a minimum pulse width condition. Accordingly, the converter preferably further includes an over-current determining circuit for determining an over-current condition responsive to the minimum pulse width condition being reached during a current limit condition. The converter may turn off the switch responsive to an over-current condition. A blanking signal may be used to clamp a comparator and established a minimum pulse width. Accordingly, a timer may also be used with the blanking signal to determine that the minimum pulse width condition has been reached. Method aspects of the invention are also disclosed.

31 Claims, 3 Drawing Sheets

DC-TO-DC CONVERTER HAVING FAST OVER-CURRENT DETECTION AND ASSOCIATED METHODS

RELATED APPLICATION

This application is based upon prior filed copending provisional application Ser. No. 60/011,695 filed Feb. 15, 1996.

FIELD OF THE INVENTION

The present invention relates to the field of electronic circuits and, more particularly, to a DC-to-DC power converter having over-current protection.

BACKGROUND OF THE INVENTION

DC-to-DC power converters are widely used to supply power to electronic devices, such as in computers, printers, etc. Such DC-to-DC converters are available in a variety of configurations for producing a desired output voltage from a source voltage. For example, a buck or step down converter produces an output voltage that is less than the source voltage. A typical step down converter includes a so-called high-side switch which is pulse width modulated to connect the source voltage to an inductor to thereby power the load.

A clock signal is typically used to trigger the high-side switch. In addition, logic circuitry typically controls turn-off of the high-side switch to thereby maintain the output voltage at a desired level and without exceeding a predetermined peak output current. It is especially important for an integrated circuit step down converter that the conversion efficiency be relatively high, and the peak current not be exceeded or thermal damage may quickly result.

An error amplifier is typically included to amplify a difference between a reference voltage and a feedback voltage to create an error voltage. The error voltage is used to set the inductor peak current in a current-mode switching converter or regulator.

Current limit may be considered a state in which the output pulse is terminated at a value of current less than necessary to maintain the output voltage. As the output voltage decreases, the rate of rise of current in the output inductor and the average current in the inductor increases such that the peak current limit value is reached in a shorter pulse width. If more and more current is demanded by the load, a point is reached where the pulse width cannot be shortened to keep the current down. Accordingly, a so-called "over-current" condition exists which may cause thermal damage to the converter if the condition is not quickly detected and the converter shut down. The conventional solution to detect such an over-current condition is to add another comparator to compare the peak current to a preset over-current threshold and to shut down or restart the regulator in response to the peak current exceeding the threshold.

Unfortunately, an additional comparator may add to circuit complexity and increase power consumption. Moreover, a comparator may be relatively inaccurate thereby permitting false shut downs of the converter. To increase accuracy, speed may be sacrificed, thereby increasing a likelihood of thermal damage to the converter.

SUMMARY OF THE INVENTION

In view of the foregoing background, it is therefore an object of the present invention to provide a DC-to-DC converter and associated method to quickly and accurately determine an over-current condition of the converter.

These and other objects, features and advantages of the present invention are provided by a DC-to-DC converter including pulse width modulation means for modulating a switch to produce current pulses having at least a minimum pulse width to thereby control an output voltage to the load. The converter preferably includes means for determining when the pulse width modulation means is in the minimum pulse width condition. Current limit determining means is also provided for determining when a desired peak current is no longer sufficient to maintain a desired output voltage thereby defining a current limit condition. The current limit determining means may be provided by an error amplifier having an input for receiving a current limit reference signal and another input for receiving a feedback signal related to a voltage of the load. Accordingly, the converter preferably further comprises over-current determining means for determining an over-current condition responsive to the minimum pulse width being reached during a current limit condition. The converter may further include shut-down means for turning off the switch responsive to an over-current condition.

The pulse width modulation means preferably also generates a switch signal related to the current in the switch and a peak current command signal. These signals are preferably coupled to the inputs of a comparator which, in turn, preferably also has an output for controlling turn-off of the switch responsive to a comparison of the switch signal and the peak current command signal. In addition, the pulse width modulation means may also comprise blanking signal generating means for generating a blanking signal related to a clock. The blanking signal may be supplied to the comparator for selectively clamping the comparator. The blanking signal thus establishes the minimum pulse width. According to another feature of the invention, the minimum pulse width determining means may be provided by a timer cooperating with the blanking signal generating means for determining a minimum pulse width condition based upon a predetermined time relative to a transition of the blanking signal.

A method aspect of the invention is for controlling a DC-to-DC power converter comprising a switch for supplying power to a load from a source. The method preferably comprises the steps of modulating the switch to produce current pulses to thereby control an output voltage to the load; and determining an over-current condition based upon the modulation reaching a minimum pulse width and when a desired current is no longer sufficient to maintain a desired output voltage. Accordingly, the converter may be shut down or restarted.

The over-current condition can be readily and accurately determined based upon typically existing signals in a converter and with the addition of relatively simple timing and logic. Moreover, the determination of the over-current condition can be relatively fast to prevent thermal damage to the converter, especially for integrated circuit embodiments of the converter.

DETAILED DESCRIPTION OF THE PREFERRED EMBODIMENTS

The present invention will now be described more fully hereinafter with reference to the accompanying drawings, in which preferred embodiments of the invention are shown. This invention may, however, be embodied in many different forms and should not be construed as limited to the embodiments set forth herein. Rather, these embodiments are provided so that this disclosure will be thorough and complete, and will fully convey the scope of the invention to those skilled in the art. Like numbers refer to like elements throughout.

Figure 1:
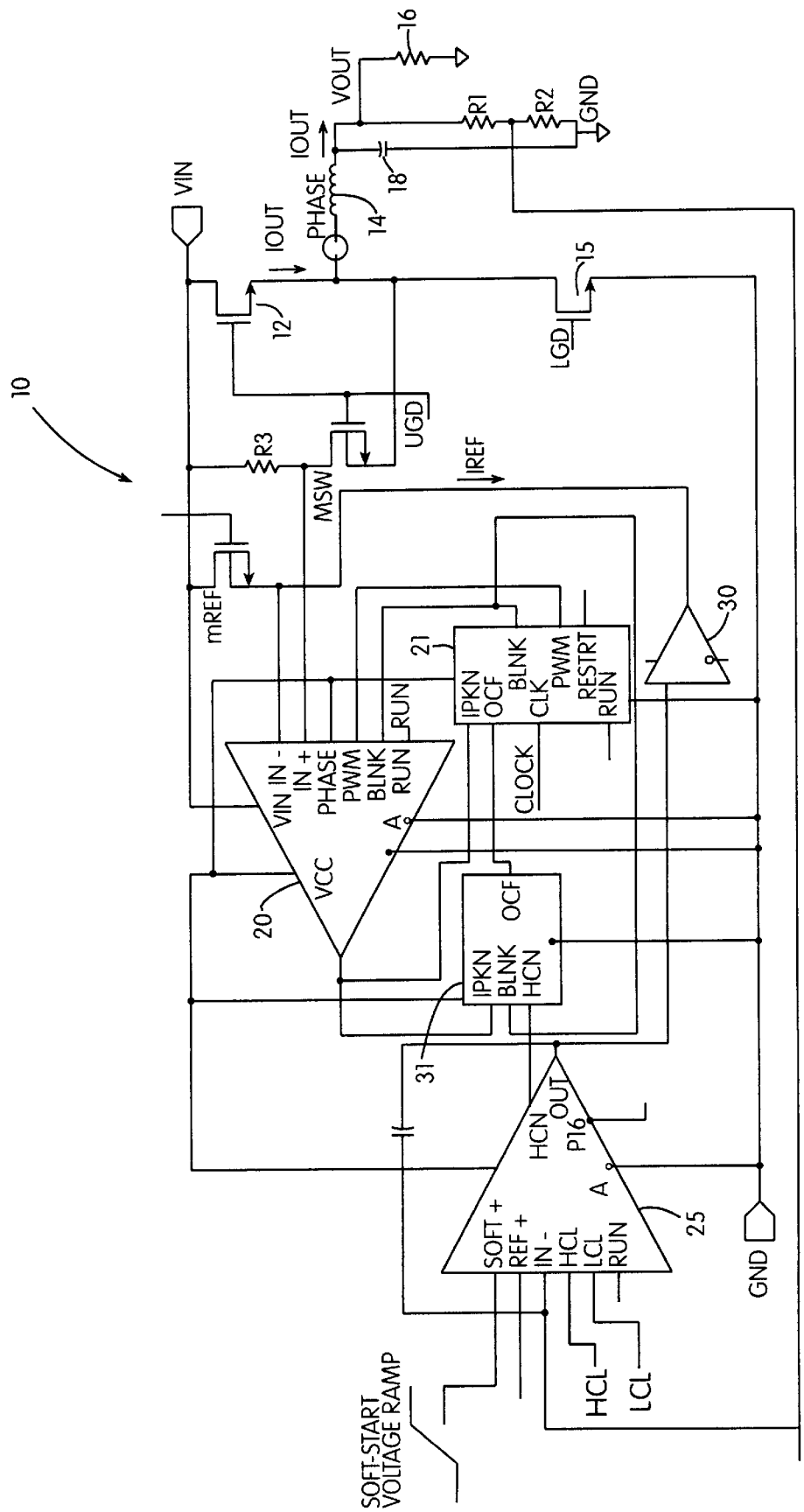
FIG. 1 is a schematic circuit diagram of a DC-to-DC converter in accordance with the present invention.

A DC-to-DC converter 10 according to the present invention is first described with reference to FIG. 1. An input voltage VIN is applied through a high-side switch 12 to the inductor 14 to supply current to a load 16. The high-side switch 12 is operated responsive to the upper gate drive signal UGD. A capacitor 18 is conventionally applied across the load 16 to smooth the voltage across it as would be readily understood by those skilled in the art.

Those of skill in the art will also readily appreciate the operation of the lower switch 15 without further discussion. The lower switch 15 is operated responsive to a lower gate drive signal LGD. Of course, as would also be readily understood by those skilled in the art, the lower switch may be replaced by a Schottky diode in other embodiments.

The switch 12 is turned on in response to a periodic clock and turned off in response to the action of the illustrated comparator 20. The percentage of the total clock period for which the high-side switch 12 is on determines the average voltage across the load 16. IREF is generated by the voltage-to-current converter 30 and the signal is an analog of the desired peak operating current of the switch 12. IREF flows through the reference transistor, MREF, to establish a reference voltage which is sensed by the inverting input IN– of the comparator 20.

The current in the high-side switch 12 creates a small voltage across the switch due to its non-zero internal resistance. This voltage is developed across the pull-up resistor R3 by transistor MSW, and applied to the non-inverting input IN+ of the comparator 20. When the voltage applied to the terminal IN+ of the comparator 20 becomes more negative than the reference voltage applied to the terminal IN– of the comparator, the comparator output switches from a high logic state to a low logic state indicating to the logic block 21 to terminate the on-time of the switch 12. This action is achieved by changing the signal PWM of the logic block 21 to a low state, and, thereby in a path not shown in FIG. 1, reducing the gate voltage of the switch 12 to zero volts. When the switch 12 is turned on, the voltage of the PHASE node is nearly equal to VIN. When switch 12 is off, the voltage of the PHASE node is near zero volts.

A blanking logic signal BLNK, generated in response to the clock in the logic block 21, is applied to the comparator 20 through the terminal also labelled BLNK. This logic level will be high during and immediately following the upward transition of the PHASE node when charging of parasitic capacitances may otherwise cause false comparator readings. The comparator output may be clamped to VCC when BLNK is high or RUN is low. In addition, the input IN+ may be clamped to VIN when BLNK is high or RUN is low. These clamps prevent a false low reading at the output during blanking or when the comparator 20 is powered down with a low RUN signal.

Considered in different terms, the logic block 21 and comparator 20 may be considered as part of pulse width modulating means for modulating the high-side switch 12 to produce current pulses having at least a minimum pulse width to thereby control an output voltage to the load 16.

The primary function of the error amplifier 25 is to amplify a difference between the reference voltage and the feedback voltage to create the error voltage which is used to set the output peak current. The feedback voltage is illustratively produced by the voltage divider provided by the resistors R1 and R2. The error amplifier 25 is also connected to the voltage-to-current converter 30 as described above. An additional input SOFTP may also be used as a reference when an increasing ramp voltage is applied during start-up as would be readily understood by those skilled in the art. This forces the regulator or converter to slowly follow the ramp voltage upward until the soft-start ramp exceeds the normal reference at which time normal error amplification takes place.

Because the output voltage of the error amplifier 25 sets the peak current to which the output goes each cycle, the HCL level represents the current limit reference value. In the error amplifier 25 during the time in which its output is clamped to the current limit reference level HCL, the output signal HCN goes to a logic level 0. This signal is used as a logic level indication of the converter being in the current limit condition. LCL represent a low current limit that requires no further discussion herein.

As would be readily understood by those skilled in the art, current limit is a state in which the output current pulse is terminated at a value of current less that necessary to maintain the output voltage to the load 16. As the output voltage decreases, the rate of rise of current in the output inductor 14 and the average current in the inductor increase such that the peak current limit value is reached in a shorter pulse width. If more and more current is demanded by the load 16, a point is reached where the pulse width cannot be shortened further to keep the current down and an over-current condition is said to exist.

A conventional approach to such an over-current condition is to add another comparator to compare the peak current to a preset over-current threshold to thereby control shut down and restart of the converter. Unfortunately, such an approach adds to the circuit complexity and cost, and a comparator may not be sufficiently fast to fully protect the converter. If speed of the comparator is increased, accuracy may be sacrificed and false trips may occur.

In accordance with one important advantage of the present invention, an over-current condition is determined or detected through the use of relatively simple timing and logic, and based upon the functions already required to perform the normal current mode control. In the illustrated over-current control logic block 31, the HCN signal from the error amplifier 25 must be indicating a current limit condition, and there must be an indication that the minimum pulse width condition has been reached. In one preferred embodiment, both of the conditions must occur in the first 20 nanoseconds after the blanking signal BLNK goes low.

Once an over-current condition is determined the logic block 21 may cause a restart within a predetermined time. For example, the logic block 21 may count two over-current determinations before causing restart.

Figure 2:
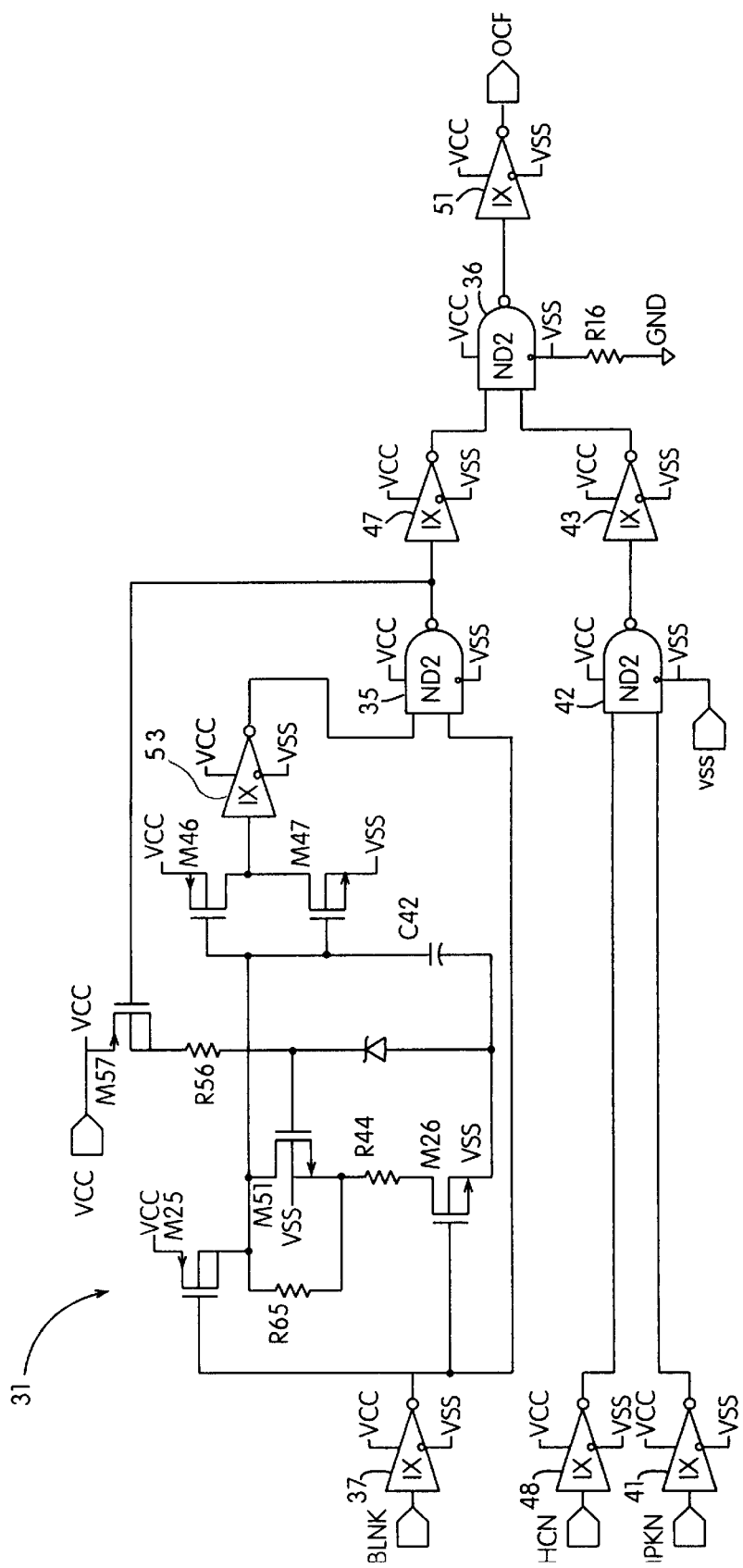
FIG. 2 is a more detailed schematic view of a portion of the over-current control logic block portion as shown in FIG. 1.

Referring now additionally to FIG. 2, an embodiment of the over-current logic control block 31 is now described. A blanking signal BLNK is presented to the control block through inverter 37. While the signal BLNK is in a logic high state, the output of the inverter 37 is low. This causes transistor M25 to be on and transistor M26 to be off. Thus, capacitor C42 is charged to a high voltage equal to VCC such that, through inverting transistors M46 and M47, the output of inverter 53 is high. When a high-to-low transition of the blanking signal BLNK occurs the output of the inverter 37 goes high and transistor M26 is turned on to start discharge of the capacitor C42 through resistors R65 and R44. during the time that the capacitor is discharging, but still at a voltage that is above the logic threshold presented by transistors M46 and M47, the output of the inverter 53 remains high. Thus, the two signals presented to the inputs of the NAND gate 35 are both high for a timing interval set by the value of capacitor C42 and the value of the discharge current. The output of the NAND gate 35 is low while its two inputs are high, thus turning on transistor M57 which turns on a zener diode D55 referenced current source provided by transistor M51 and resistor R44. This provides a well controlled discharge current for the capacitor C42.

During the timing interval, the output of the NAND gate 35 is low and is presented to the NAND gate 36 through the illustrated inverter 47. The NAND gate 36 is thus able to capture the falling IPKN signal through the illustrated inverter 41, NAND gate 42, and inverter 43. The HCN signal comes from the error amplifier 25 and is low while the error amplifier is clamping its output to the HCL level indicating a current limit condition. The HCN signal passes through the illustrated inverter 48 and gates the inverted IPKN signal at the NAND gate 42 with the net result that an over-current condition OCF is signalled to the control logic 21 if and only if IPKN is low and HCN is low and there has been a low transition in the blanking signal BLNK within a predetermined time interval. Those of skill in the art will recognize that many other practical circuit implementations of the functions described above are contemplated by the present invention.

Figure 3:
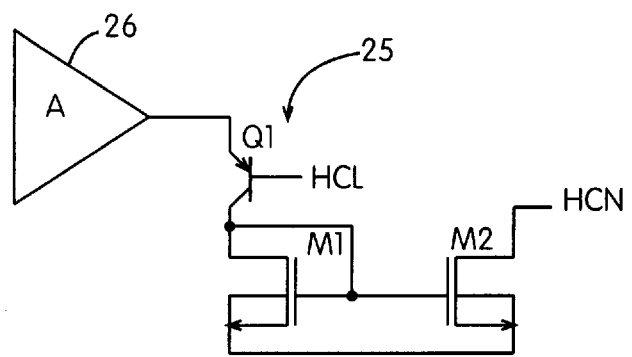
FIG. 3 is a more detailed schematic view of a portion of an error amplifier as shown in FIG. 1.

Turning now additionally to FIG. 3, a portion of the error amplifier is explained in greater detail. The error amplifier 25 illustratively includes clamping circuitry for clamping the output of the amplifier 26 to the high current limit value HCL. The illustrated circuit includes a transistor Q1 connected to mirror MOS transistors M1 and M2 to generate the HCN signal. The HCN signal is low in the illustrated embodiment when the error amplifier is being clamped. Those of skill in the art will recognize other equivalent circuit embodiments.

A method aspect of the invention is for controlling a DC-to-DC power converter 10 comprising a high-side switch 12 for supplying power to a load 16 from a source. The method preferably comprises the steps of modulating the switch 12 to produce current pulses to thereby control an output voltage to the load 16; and determining an over-current condition based upon the modulation reaching a minimum pulse width when a desired current is no longer sufficient to maintain a desired output voltage. Accordingly, the converter 10 may be shut down or restarted.

The step of modulating the switch 12 preferably comprises: generating a switch signal related to current in the switch; generating a peak current command signal; and controlling turn-off of the switch responsive to a comparison of the switch signal and the peak current command signal. The modulating preferably further comprises: generating a clock signal; and generating a blanking signal related to clock signal and for selectively clamping turn-off of the switch, the blanking signal establishing the minimum pulse width. Accordingly, the step of determining the over-current condition preferably further comprises determining that the modulation has reached the minimum pulse width based upon a predetermined time relative to a transition of the blanking signal. In addition, the step of determining the over-current condition preferably comprises comparing a current limit reference signal and an error signal related to a voltage of the load. The error signal represents a difference between the desired load voltage versus and an actual load voltage, as would be readily understood by those skilled in the art.

The over-current condition can be readily and accurately determined based upon existing signals and with the addition of relatively simple timing and logic. Moreover, the determination of the over-current condition can be relatively fast to prevent thermal damage to the converter, especially for integrated circuit embodiments of the converter. Accordingly, many modifications and other embodiments of the invention will come to the mind of one skilled in the art having the benefit of the teachings presented in the foregoing descriptions and the associated drawings. For example, the DC-to-DC converter 10 may be implemented in integrated circuit form, discrete circuit form, or a combination as would be readily understood by those skilled in the art. Therefore, it is to be understood that the invention is not to be limited to the specific embodiments disclosed, and that modifications and embodiments are intended to be included within the scope of the appended claims.

That which is claimed is:

1. A DC-to-DC power converter for supplying power to a load from a source, the converter comprising:

a switch for supplying power from the source to the load;

pulse width modulation means for modulating said switch to produce current pulses having at least a minimum pulse width to thereby control an output voltage to the load, said pulse width modulating means when modulating said switch to produce the minimum pulse width thereby defining a minimum pulse width condition;

minimum pulse width determining means for determining when the pulse width modulation means is in the minimum pulse width condition;

current limit determining means for determining when a desired peak current is no longer sufficient to maintain a desired output voltage thereby defining a current limit condition; and over-current determining means for determining an over-current condition responsive to the minimum pulse width condition being reached during a current limit condition.

2. A converter according to claim 1 further comprising shut-down means for turning off said switch responsive to an over-current condition.

3. A converter according to claim 1 wherein said pulse width modulation means comprises:

switch signal generating means connected to said switch for generating a switch signal related to current in said switch;

peak current command signal generating means for generating a peak current command signal; and a comparator having one input connected to the switch signal and another input connected to the peak current command signal, said comparator having an output for controlling turn-off of said switch responsive to a comparison of the switch signal and the peak current command signal.

4. A converter according to claim 3 wherein said pulse width modulation means further comprises:

a clock; and blanking signal generating means for generating a blanking signal related to said clock and connected to said comparator for selectively clamping said comparator, the blanking signal establishing the minimum pulse width.

5. A converter according to claim 4 wherein said minimum pulse width determining means comprises a timer cooperating with said blanking signal generating means for determining a minimum pulse width condition based upon a predetermined time relative to a transition of the blanking signal.

6. A converter according to claim 1 wherein said current limit determining means comprises an error amplifier having an input for receiving a current limit reference signal and another input for receiving a feedback signal related to a voltage of the load.

7. A converter according to claim 6 wherein said current limit determining means further comprises current limit indicating means cooperating with said error amplifier for indicating a current limit condition to said over-current determining means responsive to the feedback signal and the current limit reference signal.

8. A converter according to claim 1 further comprising an inductor connected between an output terminal of said switch and the load.

9. A DC-to-DC power converter for supplying power to a load from a source, the converter comprising:
   a switch for supplying power from the source to the load;
   pulse width modulation means for modulating said switch to produce current pulses having at least a minimum pulse width to thereby control an output voltage to the load, said pulse width modulating means when modulating said switch to produce the minimum pulse width thereby defining a minimum pulse width condition;
   minimum pulse width determining means for determining when the pulse width modulation means is in the minimum pulse width condition;
   an error amplifier having an input for receiving a current limit reference signal, having another input for receiving a feedback signal related to a voltage of the load, and having an output indicating when a desired peak current is no longer sufficient to maintain a desired output voltage thereby defining a current limit condition; and
   over-current determining means for determining an over-current condition responsive to the minimum pulse width condition being reached during a current limit condition.

10. A converter according to claim 9 further comprising shut-down means for turning off said switch responsive to an over-current condition.

11. A converter according to claim 9 wherein said pulse width modulation means comprises:
    switch signal generating means connected to said switch for generating a switch signal related to current in said switch;
    peak current command signal generating means for generating a peak current command signal; and
    a comparator having one input connected to the switch signal and another input connected to the peak current command signal, said comparator having an output for controlling turn-off of said switch responsive to a comparison of the switch signal and the peak current command signal.

12. A converter according to claim 11 wherein said pulse width modulation means further comprises:
    a clock; and
    blanking signal generating means for generating a blanking signal related to said clock and connected to said comparator for selectively clamping said comparator, the blanking signal establishing the minimum pulse width.

13. A converter according to claim 12 wherein said minimum pulse width determining means comprises a timer cooperating with said blanking signal generating means for determining a minimum pulse width condition based upon a predetermined time relative to a transition of the blanking signal.

14. A converter according to claim 9 further comprising an inductor connected between an output terminal of said switch and the load.

15. A DC-to-DC power converter for supplying power to a load from a source, the converter comprising:
    a switch for supplying power from the source to the load;
    a clock;
    a comparator having an output for controlling turn-off of said switch and thereby modulating said switch to produce current pulses having at least a minimum pulse width;
    blanking signal generating means for generating a blanking signal related to said clock and connected to said comparator for selectively clamping said comparator, the blanking signal establishing a minimum pulse width;
    a timer cooperating with said blanking signal generating means for determining a minimum pulse width condition based upon a predetermined time relative to a transition of the blanking signal;
    current limit determining means for determining when a desired peak current is no longer sufficient to maintain a desired output voltage thereby defining a current limit condition; and
    over-current determining means for determining an over-current condition responsive to the minimum pulse width condition being reached during a current limit condition.

16. A converter according to claim 15 further comprising shut-down means for turning off said switch responsive to an over-current condition.

17. A converter according to claim 15 further comprising:
    switch signal generating means connected to said switch for generating a switch signal related to current in said switch; and
    peak current command signal generating means for generating a peak current command signal;
    said comparator having one input connected to the switch signal and another input connected to the peak current command signal, said comparator having an output for controlling turn-off of said switch responsive to a comparison of the switch signal and the peak current command signal.

18. A converter according to claim 15 wherein said current limit determining means comprises an error amplifier having an input for receiving a current limit reference signal and another input for receiving a feedback signal related to a voltage of the load.

19. A converter according to claim 15 further comprising an inductor connected between an output terminal of said switch and the load.

20. A DC-to-DC power converter for supplying power to a load from a source, the converter comprising:
    a switch for supplying power from the source to the load;
    pulse width modulation means for modulating said switch to produce current pulses having at least a minimum pulse width to thereby control an output voltage to the load; and
    over-current determining means for determining an over-current condition responsive to the pulse width modulation means being at a minimum pulse width when a desired peak current is no longer sufficient to maintain a desired output voltage.

21. A converter according to claim 20 further comprising shut-down means for turning off said switch responsive to an over-current condition.

22. A converter according to claim 20 wherein said pulse width modulation means comprises:

switch signal generating means connected to said switch for generating a switch signal related to current in said switch;

peak current command signal generating means for generating a peak current command signal; and a comparator having one input connected to the switch signal and another input connected to the peak current command signal, said comparator having an output for controlling turn-off of said switch responsive to a comparison of the switch signal and the peak current command signal.

23. A converter according to claim 22 wherein said pulse width modulation means further comprises:

a clock; and blanking signal generating means for generating a blanking signal related to said clock and connected to said comparator for selectively clamping said comparator, the blanking signal establishing the minimum pulse width.

24. A converter according to claim 23 wherein said over-current determining means further comprises a timer cooperating with said blanking signal generating means for determining that said pulse width modulation means is at the minimum pulse width based upon a predetermined time relative to a transition of the blanking signal.

25. A converter according to claim 20 wherein said over-current determining means comprises an error amplifier having an input for receiving a current limit reference signal and another input for receiving a feedback signal related to a voltage of the load.

26. A method for controlling a DC-to-DC power converter comprising a switch for supplying power to a load from a source, the method comprising the steps of:

modulating the switch to produce current pulses to thereby control an output voltage to the load; and determining an over-current condition based upon the modulation reaching a minimum pulse width when a desired current is no longer sufficient to maintain a desired output voltage.

27. A method according to claim 26 further comprising the step of turning off the switch responsive to an over-current condition.

28. A method according to claim 26 wherein the step of modulating the switch comprises:

generating a switch signal related to current in the switch;

generating a peak current command signal; and controlling turn-off of the switch responsive to a comparison of the switch signal and the peak current command signal.

29. A method according to claim 28 wherein the step of modulating the switch further comprises;

generating a clock signal; and generating a blanking signal related to clock signal and for selectively clamping turn-off of the switch, the blanking signal establishing the minimum pulse width.

30. A method according to claim 29 wherein the step of determining the over-current condition further comprises determining the modulation has reached the minimum pulse width based upon a predetermined time relative to a transition of the blanking signal.

31. A method according to claim 26 wherein the step of determining the over-current condition comprises comparing a current limit reference signal and an error signal related to a voltage of the load.

* * * * *